J. WEBSTER.
Journal Box.
No. 32,604.
Patented June 18, 1861.
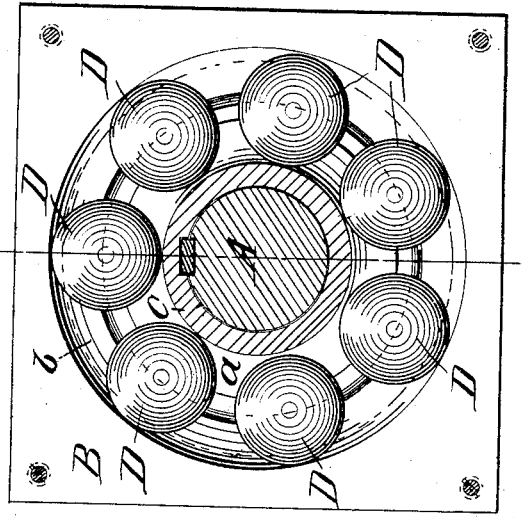
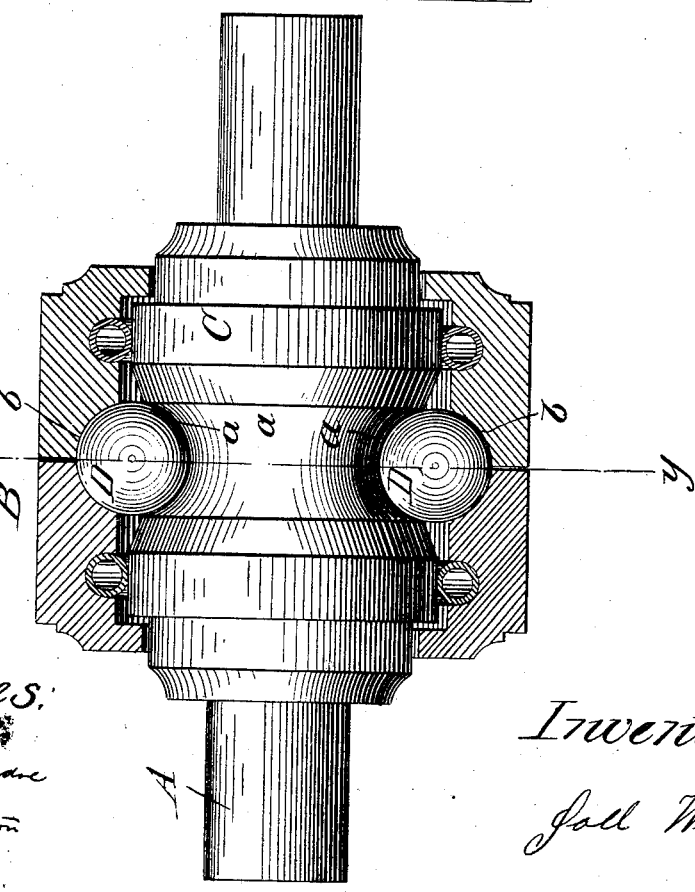
Witnesses:
Inventor.
Jad Webster

UNITED STATES PATENT OFFICE.

JOEL WEBSTER, OF BROOKLYN, NEW YORK, ASSIGNOR TO HIMSELF AND G. C. HOTCHKISS AND T. H. HOTCHKISS, OF SAME PLACE.

JOURNAL-BOX.

Specification of Letters Patent No. 32,604, dated June 18, 1861.

*To all whom it may concern:*

Be it known that I, JOEL WEBSTER, of Brooklyn E. D., in the county of Kings and State of New York, have invented a new and Improved Journal-Box; and I do hereby declare that the following is a full, clear, and exact description of the same, reference being had to the accompanying drawings, forming a part of this specification, in which—

Figure 1, represents a longitudinal vertical section of my invention, the line $x$, $x$, Fig. 2, indicating the plane of section. Fig. 2, is a transverse vertical section of the same taken in the plane indicated by the line $y$, $y$, Fig. 1.

Similar letters of reference in both views indicate corresponding parts.

In order to prevent the weakening of the shaft or the journal, a sleeve is firmly keyed to the shaft and one or more half circular grooves in this sleeve in connection with one or more similar grooves in the inner surface of the journal box form the bearings for the balls in such a manner, that said balls allow the shaft to rotate, freely, at the same time preventing it moving in a longitudinal direction. Indiarubber tubes or other packing secured in the ends of the journal box and bearing on those portions of the sleeve which are situated on either side of the groove or grooves, serve to keep the dust from passing in to the balls.

To enable those skilled in the art to make and use my invention, I will proceed to describe its construction and operation with reference to the drawing.

The shaft A, which may represent a portion of a line shaft or the axle of a pair of wheels passes through and rotates in the journal box B. The journal of the shaft, instead of being turned in and weakening the shaft, is strengthened by a sleeve C, which is firmly keyed to the shaft. This sleeve fits quite loosely into the box and it is provided with a half circular groove $a$, which corresponds to a similar half circular groove $b$, in the inner surface of the box B. The box is made out of two halves, which divide either in vertical direction as shown in the drawing or which may be made to divide in a horizontal direction similar to boxes of the ordinary construction. Each half of the box contains exactly one half of the groove $b$, and if the box is arranged as shown in the drawing, the groove is divided by a plane running at right angles to the shaft. The two grooves $a$, and $b$, form the bearings for a series of balls D, and the whole is so arranged, that when the balls are inserted and the two halves of the box are firmly secured together, said balls form the sole bearing of the shaft or sleeve and no portion of the sleeve or shaft is allowed to come in contact with the box. By this arrangement of the balls and grooves the whole friction of the journal in the box produced by a strain in a direction at right angles to the shaft and also by a strain in a longitudinal direction parallel with the shaft or in any other direction is reduced to a rolling friction and at the same time by the employment of the sleeve C, the full strength of the shaft is preserved.

In order to prevent the dust passing into the grooves $a$, $b$, and on the balls D, I have inserted into the box B, on either side of the groove $b$, a ring E, made of indiarubber tube or of any other soft and elastic material. These rings are of such a size, that they bear on the flat surfaces $c$, of the sleeve, said surfaces being situated on either side of the groove $a$, in the sleeve. The friction produced by the action of these packing rings on the flat surfaces $c$, of the sleeve, is of no account and by their action the dust or other impurities are prevented passing into grooves $a$, $b$, and on the balls.

The construction of this journal box and journal is very simple. The box B, or at least that portion of the same containing the groove $b$, the sleeve C, or that portion of the same containing the groove $a$, and the balls D, may be made of chilled cast iron, and the whole may be put together without requiring much fitting or turning. By these means a cheap effective and durable journal box is produced.

Having thus fully described my invention what I claim as new and desire to secure by Letters Patent, is—

The employment of the sleeve C, with one half circular groove $a$, in combination with the shaft A, balls D, and box B, the latter being provided with one half circular groove $b$, and the whole being arranged, constructed and operating substantially as and for the purpose herein set forth.

JOEL WEBSTER.

Witnesses:
L. M. BENDRÉ,
M. M. LIVINGSTON.